3,296,123
REMOVAL OF CESIUM FROM AQUEOUS SOLUTIONS BY ION EXCHANGE
William E. Prout, Aiken, Edwin R. Russell, Columbia, and Harold J. Groh, Jr., Aiken, S.C., assignors to the United States of America as represented by the United States Atomic Energy Commission
No Drawing. Filed Apr. 1, 1964, Ser. No. 357,022
14 Claims. (Cl. 210—38)

The present invention relates generally to a method for the removal of cesium values from aqueous solutions by ion exchange and more particularly to a process for the selective removal of cesium values from aqueous solution by sorption on potassium cobalt ferrocyanide ion exchange material.

As is generally known, neutron bombardment of uranium and/or plutonium fissionable fuel in a neutronic reactor, results in the production of numerous fission products comprising isotopes of many elements and transuranic elements. In the processing of such neutron-irradiated nuclear reactor fuels by aqueous separation means, such as by solvent extraction or precipitation, to recover specifically desired isotopes, aqueous waste solutions are obtained which contain, in comparatively small concentrations, the bulk of the fission products formed during irradiation. In addition to these fission products, these solutions usually contain comparatively large concentrations of salts the addition of which is necessary for the various processing steps; for instance, nitrates of sodium, aluminum, or calcium necessary for salting out purposes, reducing or oxidizing agents for conversion of the actinides from one oxidation state to another, and decomposition products formed during reaction from these reducing or oxidizing agents, are often present in macroconcentrations.

Of the fission products present in the above-described type waste solutions, the cesium–137 isotope is one of the most predominant, hazardous, and difficult to handle and store safely. Cesium–137, a gamma and beta emitter, is formed in high yield (about 6.1%) and has a long half-life (about 30 years) with radiation strong enough to be hazardous over a long period of time because of its slow rate of decomposition due to radioactive decay, thereby requiring lengthy permanent storage. After six years storage of an alkaline waste solution, about 98% of the activity in the supernatant solution is from cesium–137. Because of its radiation strength over a long period of time, cesium–137 has been found useful for sterilization of food, for polymerization of hydrocarbons, for the production of mobile atomic batteries, for teletherapy, and for radiography. It is therefore desirable to remove cesium–137 from waste solutions to make the solutions less hazardous, more amenable to conventional waste handling techniques and to use the recovered cesium isotope as a useful radiation energy source.

Heretofore, a number of direct and carrier precipitation methods, based on the formation of complex ferro- or ferricyanides, have been used for the separation and/or removal of cesium aqueous solutions. In these processes, potassium ferrocyanide and a heavy metal salt, such as nickel, iron, cobalt, or zinc, are added to the aqueous solution containing cesium values and the cesium is carried out of the solution on the resulting ferrocyanide carrier precipitate. While cesium separation is generally good, the ferrocyanide precipitate carrying the cesium readily peptizes to form a colloidal suspension that is extremely difficult to separate from the solution by settling, filtration or centrifugation. This difficulty is multiplied by the necessity for handling these fission product-containing solutions by remote control. Another disadvantage of these processes is that a large excess of precipitating agent is required which results in comparatively voluminous ferrocyanide precipitates. Further, these carrier precipitation processes are generally pH-dependent, requiring acidic or slightly alkaline (pH less than 10) conditions for effective removal of cesium, and are not suitable for removal of cesium from highly alkaline solutions (without expensive acidification) because the heavy metals precipitate as hydroxides and the desired ferrocyanide complexes do not form. This is particularly significant, since most of the high activity waste solutions in storage or being produced by nuclear reactor fuel processing facilities are highly alkaline (pH greater than 13).

An object of the present invention, therefore, is to provide an improved process for the removal of cesium values from aqueous solutions.

It is another object of this invention to provide a process for the removal of cesium values from aqueous solutions by means of selective sorption and elution.

Another object of this invention is to provide a process for the removal of cesium values from highly alkaline aqueous waste solutions.

Still another object of the present invention is to provide a process for the removal of cesium from aqueous solutions which does not require prior pH adjustment of the aqueous solutions.

It is still another object of this invention to provide a process for the removal of cesium values from aqueous solutions which lends itself to operation by remote control.

Other objects and advantages of this invention will be apparent to those skilled in the art from the following description and appended claims.

In accordance with our invention, we have provided a process for removing cesium values from an aqueous solution containing said values which comprises contacting said solution with a potassium cobalt ferrocyanide ion exchange material whereby the cesium values are preferentially taken up by the ion exchange material. The resulting cesium value-loaded ferrocyanide ion exchange material is then separated from the depleted aqueous solution. If the cesium is to be removed from the ion exchange material, it is eluted with a solution of either thallium nitrate or mercuric nitrate.

Further, we have found, unexpectedly, that potassium cobalt ferrocyanide, prepared in a crystalline granular form, is stable in highly acidic and highly alkaline solutions, and shows a high degree of specificity for the sorption of cesium values from concentrated salt solutions, thereby serving as an effective ion exchange material for the selective and substantially complete removal of cesium values from fission product waste solutions in a wide range of pH values and in the presence of large concentrations of alkali and alkaline earth cations. Potassium cobalt ferrocyanide in the crystalline granular state, hereinafter described, is also stable in the presence of radiation levels usually encountered in fission product waste solutions, and resists peptization even in highly alkaline waste solutions.

We attribute the success of our invention in considerable degree to the unexpected benefits accruing from the careful preparaion of potassium cobalt ferrocyanide salt in granular crystalline form for use as an ion exchange material rather than as a carrier precipitate described in the prior art. The formation of potassium cobalt ferrocyanide [which in more precise nomenclature is potassium hexacyanocobalt (II) ferrate (II)] is represented generally by the following equation:

$$K_4Fe(CN)_6 + Co(NO_3)_2 = K_2[CoFe(CN)_6] + 2KNO_3)$$
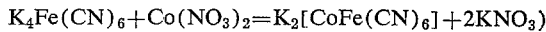

wherein other cobalt salts may be substituted for the $Co(NO_3)_2$. To prepare potassium cobalt ferrocyanide ion exchange material, an aqueous solution of potassium ferrocyanide is added slowly to an aqueous solution having a stoichiometric excess of a cobalt salt, such as cobalt nitrate, cobalt sulfate or cobalt chloride, with gentle agitation to form a green ferrocyanide complex precipitate. After carefully stirring for a suitable length of time, the precipitate is separated from the supernatant solution by conventional centrifugation to yield a centrifuged cake of potassium cobalt ferrocyanide which is washed with water several times to remove soluble salts and dried slowly at a temperature below about 150° C. to form small lumps of crystalline potassium cobalt ferrocyanide product. These lumps are crushed and graded to the screen size required for ion exchange, washed with water to remove fines, and redried at a temperature below about 120° C. to yield granular crystalline potassium cobalt ferrocyanide suitable for use as ion exchange material.

In the precipitation step, the order of addition of the reagents, i.e., $K_4Fe(CN)_6$ is added to the cobalt salt, and the presence of 40 to 50% stoichiometric excess of cobalt salts is important to prevent the formation of colloidal products or slimes that are difficult to centrifuge. Also, these colloidal products or slimes will dry to form a fine powder which readily peptizes in alkaline solutions rather than a granular crystalline product suitable for ion exchange material. The temperature of the precipitation should be maintained below 30° C. and is preferably maintained at or below about 15° C. While timing is not critical, the precipitation is preferably conducted within about 30 minutes or less and the overall time from start of precipitation to the start of the first drying of the centrifuge cake should be limited to about 6 hours. Since improper drying of the centrifuged cake will also produce a product which readily peptizes, the drying temperature should be maintained at about 120° C. and the thickness of the cake being dried is preferably about one inch.

The following specific example is given to illustrate the preferred method of preparing potassium cobalt ferrocyanide suitable for use as ion exchange material in the process of our invention.

Example I

A first aqueous solution 0.5M in $K_4Fe(CN)_6$ was prepared from potassium ferrocyanide trihydrate $$[K_4Fe(CN)_6 \cdot 3H_2O]$$

and buffered at pH 5.3 with sodium acetate acid. A second aqueous solution 0.3M in cobalt nitrate was prepared from cobalt nitrate hexahydrate.

One volume of the $K_4Fe(CN)_6$ solution was added within a period of 20 minutes to 2.4 volumes of the $Co(NO_3)_2$ solution while the latter solution was agitated by air sparging and while the reaction temperature was maintained at 5° C.

The resulting slurry, including a green potassium cobalt ferrocyanide precipitate, was agitated for 10 minutes and centrifuged to separate the precipitate from the solution. The centrifuged cake of potassium cobalt ferrocyanide which contained about 80% water was washed three times with water at 5° C. and recentrifuged after each washing. The cake was then placed in drying pans in layers about ¾ inch thick and dried for 15 hours at 115° C. (to constant weight; ±2%). The dried crystalline potassium cobalt ferrocyanide was crushed to pass a 30-mesh screen (U.S. Sieve Series) and washed with water to remove fines smaller than 100 mesh. The product was redried at 115° C. for 4 hours to yield granular crystalline potassium cobalt ferrocyanide ion exchange material.

Potassium cobalt ferrocyanide ion exchange material prepared by the method described above consists of discrete crystalline particles or granules having the same crystal structure as the well known compound Prussian blue (as indicated by X-ray diffraction analysis). Analyses of the product for potassium, cobalt and ion by atomic absorption spectroscopy showed the atom ratio of K: Co: Fe to be 1.6: 1.4: 1.0. These data indicate that the product is not pure $K_2[CoFe(CN)_6]$, but some mixture of $K_2CoFe(CN)_6]$ and $Co[CoFe(CN)_6]$. Chemical stability tests indicated that this ion exchange material is stable in nitric and hydrochloric acids and in highly salted alkaline solutions. For instance, only a negligible amount of potassium cobalt ferrocyanide ion exchange material dissolved in boiling concentrated nitric acid, hydrochloric acid, and in a highly alkaline solution containing 1M sodium hydroxide and 4M sodium nitrate. Further, sorbed cesium was not released from the ion exchange material after substantial radiation exposure.

While it is not intended that the process of our invention be limited to any particular theory, it is postulated that cesium is sorbed from solution by the replacement or exchange of potassium ions in the potassium cobalt ferrocyanide crystal structure. Although the Cs–K exchange may not be quantitative because of the complex heterogeneous nature of the ferrocyanide crystals, chemical tests demonstrated this exchange qualitatively.

Potassium cobalt ferrocyanide ion exchange material is contacted with a cesium-containing aqueous solution in the same manner as with conventional solid ion exchange resins, either by batch mixing of the granular ion exchange material and the cesium-containing aqueous solution, or by flowing the solution through a stationary or moving columnar bed of ion exchange material. A stationary columnar bed is preferred because of the semi-continuous nature of ion exchange column extraction methods. Whether using a batch method or a column method, potassium cobalt ferrocyanide ion exchange material may be employed in a wide variety of particle sizes from about −4 mesh to about +200 mesh (U.S. Sieve Series). The use of smaller particle size results in a more rapid sorption, because of the increased surface area. However, extremely small particles produce a high resistance to liquid flow in columnar operation and a compromise must be made between particle size and an efficient, economic flow rate. A satisfactory compromise between hydraulic and diffusion efficiencies may be obtained by using approximately −20+100 mesh range, while a mesh size of approximately −30+60 is preferred for optimum results.

Although the potassium cobalt ferrocyanide ion exchange material is effective for recovering cesium from aqueous solutions in a wide range of pH conditions, we have found that the best cesium capacity is obtained in either highly acidic or highly alkaline solutions as opposed to neutral solutions. This is illustrated in the following Table I.

TABLE I.—EFFECT OF ACIDITY AND ALKALINITY ON SORPTION OF CESIUM
Ion exchange material: 5 ml. column (3 g.) −30+60 mesh granular potassium cobalt ferrocyanide (PCF).
Liquid residence time: 4 minutes.

| Test No. | Components of Solution, M | | | | pH (approximate) | Waste Capacity[a] Bed Volumes | Cs Capacity[b] meq. Cs/g. PCF |
| --- | --- | --- | --- | --- | --- | --- | --- |
| | $CsNO_3$ | $HNO_3$ | NaOH | $NaNO_3$ | | | |
| 1 | 0.008 | 0.3 | | 4.0 | 0.2 | 70 | 0.50 |
| 2 | 0.01 | | | | 7 | 16 | 0.27 |
| 3 | 0.01 | | $10^{-5}$ | | 9 | 17 | 0.28 |
| 4 | 0.01 | | 0.001 | | 11 | 19 | 0.32 |
| 5 | 0.01 | | 0.01 | | 12 | 26 | 0.43 |
| 6 | 0.01 | | 0.10 | | 13 | 26 | 0.43 |
| 7 | 0.01 | | 1.0 | | 14 | 39 | 0.65 |

[a] Capacity to 1% instantaneous breakthrough of cesium.
[b] Capacity based on 50% instantaneous breakthrough of cesium.

In the first test in the above Table I, 99% of the cesium was removed from the 70 bed volumes of simulated acid waste passed through the top exchange column. Further, the smallest cesium capacity was obtained with the neutral solution and the capacity increased markedly as the alkalinity of the solution was increased. Therefore, while it is desirable to use either acid or alkaline solution to obtain optimum ion exchange capacity, effective cesium removal is also obtained from neutral solutions and the best recoveries are achieved from highly alkaline solutions.

The following specific examples will serve to further illustrate the process of our invention in greater detail.

*Example II*

A simulated radioactive waste solution containing cesium was prepared having a pH over 14 and having the following composition:

1.5M NaOH,
4.7M NaNO$_3$,
1.2M NaAlO$_2$,
0.05M Na$_2$SO$_4$,
0.005M KNO$_3$,
0.0002M CsNO$_3$, traced with Cs$^{137}$, 5×10$^4$ disintegrations/(min)(ml).

100 mg. batches of −30+60 mesh crystalline potassium cobalt ferrocyanide ion exchange material, prepared as described in Example I, were mixed with 50 ml. samples of the simulated waste solution for batch equilibration tests for varying contact times. At the selected time, the ion exchange crystals were separated from the solutions and the solutions analyzed. The results of these tests are summarized in Table II. The distribution coefficient $K_d$, as used in Table II, is defined as the ratio of cesium sorbed per gram of potassium cobalt ferrocyanide to the cesium remaining in solutions, per ml. of solution.

TABLE II

| Equilibration Time, minutes | Distribution Coefficient $K_d$ | Cs Removed, percent |
|---|---|---|
| 1.0 | 1,170 | 70.0 |
| 7 | 1,300 | 72.2 |
| 15 | 1,800 | 78.3 |
| 31 | 6,100 | 92.4 |
| 60 | 10,100 | 95.3 |
| 120 | 10,500 | 95.4 |

Table II indicates that cesium take up by potassium cobalt ferrocyanide ion exchange material is rapid, substantially all of the cesium (over 95%) is removed and equilibrium is reached in about one hour. These tests also demonstrated that this ion exchange material is highly selective for cesium in the presence of large concentrations of sodium, aluminum and potassium ions usually present in radioactive waste solutions.

*Example III*

Highly radioactive alkaline waste (99% of the radioactivity due to Cs), stored for six years and having a pH of 14, contained the following constituents:

0.58M NaOH,
0.47M Na$_2$CO$_3$,
0.06M NaAlO$_2$,
2.02M NaNO$_3$,
0.23M Na$_2$SO$_4$,
1.65M NaNO$_2$,
0.003M KNO$_3$, and
0.0003M cesum, including one curie of cesium–137 per liter.

Crystalline granular potassium cobalt ferrocyanide ion exchange material, prepared by the method described in Example I, was mixed with the above solution in the ratio of two grams of material per liter of solution for one hour. The ion exchange material was separated from the solution and analyzed. 96% of the cesium was removed from the waste solution by the ion exchange material.

*Example IV*

A highly radioactive alkaline waste solution contained the following constituents:
0.58M NaOH
0.47M Na$_2$CO$_3$
0.06M NaAlO$_2$
2.02M NaNO$_3$
0.23M Na$_2$SO$_4$
1.65M NaNO$_2$
0.003M KNO$_3$, and
3×10$^{-4}$M CsNO$_3$, including one curie of cesium–137 per liter of solution.

The above solution which had a pH of 14 was passed through an ion exchange column having a fixed bed of −30+60 mesh granular potassium cobalt ferrocyanide crystals at a flow rate of 0.25 ml./min. The ion exchange material selectively removed 99% of the cesium from 300 bed volumes of waste solution.

*Example V*

A simulated low-level radioactive waste solution containing 4.25M NaCl and cesium–137 in a tracer concentration of 5×10$^4$ disintegrations per minute per milliliter was passed through a 10 ml. fixed bed column of −30+60 mesh granular potassium cobalt ferrocyanide crystals at a flow rate of 1.5 ml./min. The potassium cobalt ferrocyanide ion exchange material selectively removed 99.9% of the cesium from greater than 40,000 bed volumes of the feed solution. This example shows the exceptional volumetric capacity of potassium cobalt ferrocyanide ion exchange material as an ion exchange medium.

Cesium value-loaded potassium cobalt ferrocyanide, separated from the aqueous solution, may be eluted with solutions of either mercuric nitrate or thallium nitrate. For instance, 20 bed volumes of a solution 0.1M in Hg(NO$_3$)$_2$ removed 95% of the cesium sorbed on the ion exchange material, but the mechanism is not one of simple ion exchange as the potassium cobalt ferrocyanide is partially decomposed and unsuitable for regeneration. Thallium nitrate is also highly effective in eluting sorbed cesium. For example, seven bed volumes of 0.02M TlNO$_3$ eluted greater than 99% of the cesium sorbed on the granular potassium cobalt ferrocyanide; however, the ion exchange material is still unsuitable for regeneration with potassium ions.

The foregoing description and examples are not intended to restrict the scope of our invention and our invention should be construed as limited only to the extent indicated by the appended claims.

Having described our invention, we claim the following:

1. A process for selectively removing cesium values from an aqueous solution containing said cesium values which comprises contacting said solution with preformed stable particles of potassium cobalt ferrocyanide ion exchange material to take up said cesium values on said ion exchange material, said ion exchange material being prepared by adding an aqueous solution of potassium ferrocyanide to an aqueous solution containing at least about 40 to 50% stoichiometric excess of a cobalt salt to form a potassium cobalt ferrocyanide precipitate, removing and drying said precipitate at a temperature not to exceed about 150° C. to form a crystalline potassium cobalt ferrocyanide ion exchange material; and separating the resulting cesium value-loaded ion exchange material from the cesium value-depleted aqueous solution.

2. The process of claim 1 wherein the pH of said aqueous solution is between about 1 and 14.

3. The process of claim 1 wherein said potassium cobalt ferrocyanide ion exchange material is granular and has a particle size larger than 200 mesh.

4. A process for selectively recovering cesium values from an aqueous solution containing said values which comprises contacting said solution with preformed stable particles of potassium cobalt ferrocyanide ion exchange material to sorb said cesium values on said ion exchange material, said ion exchange material being prepared by adding an aqueous solution of potassium ferrocyanide to an aqueous solution containing a stoichiometric excess of a cobalt salt to form a potassium cobalt ferrocyanide precipitate, removing and drying said precipitate at a temperature not to exceed about 150° C. to form a crystalline potassium cobalt ferrocyanide ion exchange material; separating said cesium value-loaded ion exchange material from said aqueous solution, and contacting said ion exchange material with an aqueous solution containing a salt selected from the group consisting of thallium nitrate and mercuric nitrate whereby said cesium values are eluted from said ion exchange material.

5. The process of claim 4 wherein the cesium values are eluted from said potassium cobalt ferrocyanide with an aqueous solution of thallium nitrate.

6. The process of claim 5 wherein the thallium nitrate solution has a concentration of about 0.02M.

7. A process for selectively removing cesium values from an aqueous solution containing said cesium values which comprises contacting said solution with an ion exchange material to sorb said cesium values on said material, said ion exchange material being prepared by adding an aqueous solution of potassium ferrocyanide to an aqueous solution containing a stoichometric excess of a cobalt salt to form a potassium cobalt ferrocyanide precipitate, removing and drying said precipitate at a temperature not to exceed about 150° C. to form a crystalline potassium cobalt ferrocyanide ion exchange material; and separating the resulting cesium value-loaded ion exchange material from said cesium value-depleted aqueous solution.

8. The process of claim 7 wherein the cobalt salt is selected from a group consisting of cobalt nitrate, cobalt sulfate, and cobalt chloride.

9. The process of claim 7 wherein said crystalline potassium cobalt ferrocyanide is granular and has a particle size larger than about 200 mesh.

10. The process of claim 7 wherein said cobalt salt is cobalt nitrate and the temperature of potassium cobalt ferrocyanide precipitation is less than 30° C.

11. A process for selectively removing cesium values from an aqueous solution containing said values which comprises preparing stable potassium cobalt ferrocyanide ion exchange material in crystalline granular form by adding an aqueous solution of potassium ferrocyanide to an aqueous solution containing a stoichiometric excess at least about 40 to 50% of a cobalt salt to form a potassium cobalt ferrocyanide precipitate, removing and drying said precipitate at a temperature not to exceed about 150° C. to form a crystalline potassium cobalt ferrocyanide ion exchange material; contacting said ion exchange material with said aqueous solution containing said cesium values, whereby cesium is taken up by said ion exchange material, and separating the cesium value-loaded ion exchange material from said cesium value-depleted solution.

12. The process of claim 11 wherein the cobalt salt is selected from a group consisting of cobalt nitrate, cobalt sulfate, and cobalt chloride.

13. The process of claim 11 wherein the temperature of potassium cobalt ferrocyanide precipitation is maintained at less than 30° C.

14. A method of preparing stable crystalline potassium cobalt ferrocyanide which comprises adding a aqueous solution of potassium ferrocyanide to an aqueous solution containing a stoichiometric excess of a cobalt salt selected from the group consisting of cobalt nitrate, cobalt sulfate and cobalt chloride to form a potassium cobalt ferrocyanide precipitate while maintaining the temperature of said precipitation below about 30° C., separating said precipitate from said solution, and drying said precipitate at a temperature not to exceed about 150° C.

References Cited by the Examiner

UNITED STATES PATENTS

| | | | |
|---|---|---|---|
| 1,589,041 | 6/1926 | Barsky | 23—77 |
| 2,564,756 | 7/1951 | Gessler et al. | 23—77 |
| 2,769,780 | 11/1956 | Clifford et al. | 23—77 XR |
| 3,032,497 | 4/1962 | Rhodes et al. | 210—38 |
| 3,118,831 | 1/1964 | Morris | 210—38 |

MORRIS O. WOLK, *Primary Examiner.*

JOSEPH SCOVRONEK, *Examiner.*

E. G. WHITBY, *Assistant Examiner.*